(12) United States Patent
Feinberg

(10) Patent No.: US 7,234,139 B1
(45) Date of Patent: Jun. 19, 2007

(54) COMPUTER MULTI-TASKING VIA VIRTUAL THREADING USING AN INTERPRETER

(75) Inventor: Matthew A. Feinberg, Ghent, NY (US)

(73) Assignee: Catharon Productions, Inc., Sedona, AZ (US)

( * ) Notice: Subject to any disclaimer, the term of this patent is extended or adjusted under 35 U.S.C. 154(b) by 979 days.

(21) Appl. No.: 09/721,695

(22) Filed: Nov. 24, 2000

(51) Int. Cl.
*G06F 9/455* (2006.01)
*G06F 9/46* (2006.01)

(52) U.S. Cl. .......................................... 718/1; 718/100
(58) Field of Classification Search ............. 718/1–108
See application file for complete search history.

(56) References Cited

U.S. PATENT DOCUMENTS

| | | | |
|---|---|---|---|
| 4,744,048 A * | 5/1988 | Blanset et al. ............... | 345/806 |
| 6,141,732 A | 10/2000 | Adams | |
| 6,226,789 B1 | 5/2001 | Tye et al. | |
| 6,233,599 B1 * | 5/2001 | Nation et al. ............... | 718/102 |
| 6,240,440 B1 | 5/2001 | Kutcher | |
| 6,260,150 B1 * | 7/2001 | Diepstraten et al. ........ | 713/323 |
| 6,269,391 B1 | 7/2001 | Gillespie | |
| 6,282,701 B1 | 8/2001 | Wygodny et al. | |
| 6,289,446 B1 | 9/2001 | Nilsson | |
| 6,766,515 B1 * | 7/2004 | Bitar et al. .................. | 718/100 |

* cited by examiner

*Primary Examiner*—Meng-Al T. An
*Assistant Examiner*—Kenneth Tang
(74) *Attorney, Agent, or Firm*—R. Neil Sudol; Henry D. Coleman; William J. Sapone

(57) ABSTRACT

In the operation of a computer, a plurality of bytecode or pseudocode instructions, at least some of the pseudocode instructions comprising a plurality of machine code instructions, are stored in a computer memory. For each of a plurality of tasks or jobs to be performed by the computer, a respective virtual thread of execution context data is automatically created. The virtual threads each include (a) a memory location of a next one of the pseudocode instructions to be executed in carrying out the respective task or job and (b) the values of any local variables required for carrying out the respective task or job. At least some of the tasks or jobs each entails execution of a respective one of the pseudocode instructions comprising a plurality of machine language instructions. Each of the tasks or jobs are processed in a respective series of time slices or processing slots under the control of the respective virtual thread, and, in every context switch between different virtual threads, such context switch is undertaken only after completed execution of a currently executing one of the pseudocode instructions.

29 Claims, 9 Drawing Sheets

US 7,234,139 B1

COMPUTER MULTI-TASKING VIA VIRTUAL THREADING USING AN INTERPRETER

BACKGROUND OF THE INVENTION

The present invention relates to a method and an associated apparatus for performing multiple tasks simultaneously on a computer.

Most modern operating systems have native multi-tasking or multi-threading capabilities, that is, multi-threading capabilities built into the operating system. Notable exceptions are versions of the Macintosh Operating System (MacOS) prior to OS X, which possess little or no multi-threading capabilities. Unfortunately, the multi-threading capabilities provided differ depending on the operating system and hardware platform. Many platforms impose limits on the total number of threads that can exist simultaneously, and some platforms cannot multi-thread at all.

In order to properly understand the problems introduced by threading in the software and their solutions, it is necessary to understand the general approach to multi-threading and the specific approach used by most platform-native threading systems.

To perform multiple processing tasks at once, an obvious solution is to provide multiple sets of processing circuitry in the computer system. However, the typical desktop computer only has one processor, and even high-end workstations only have between one and four processors.

The software based solution is time slicing, that is, dividing the processor's time into a series of tiny slices, and devoting each slice in turn to a different task or thread. Typically, each thread is allowed to run for between 3 ms and 30 ms depending on the operating system, at which time that thread is suspended and another thread is allowed to run. The operating system usually uses the processor's timer interrupt to periodically interrupt the currently executing thread and invoke the operating system's thread scheduler, a piece of software that saves the current thread's state or execution context, selects a new thread to run, restores the new thread's saved execution context, and then allows the processor to resume normal execution. This process is known as a context switch.

In addition to occurring when a time slice expires, a context switch can also occur if the thread enters a wait state, a state in which the thread has nothing to do until a specific event occurs. When a thread enters such a state, the thread scheduler is invoked and a context switch occurs so that some other thread may use the remainder of the time slice.

A typical event that can cause a thread to enter a wait state occurs when the thread attempts to access memory that has been paged to disk. The operating system suspends the thread until the memory system has had a chance to page in the memory. Other events causing a thread to enter a wait state are the thread's checking for user input and the thread's attempting to read from the disk. In the latter case, the operating system suspends the thread until the disk read completes, allowing other threads to perform processing tasks while the first thread waits for the data to be read from disk. Yet another event that can induce a thread to enter a wait state occurs when the thread specifically yields the remainder of its time slice. This may happen if, for example, the thread has nothing more to do for a while.

Because context switches can occur with great frequency, it is critical for the context switch operating to be extremely fast Many operating systems place limits on the number of threads that can exist in the system. Windows 95 has a maximum of about 150–200 threads before system becomes unstable, whereas BeOS has a maximum of 4096 threads per processor. Such a limitation in the number of threads is a result of an operating system pre-allocating, for performance reasons, a fixed-size chunk of memory for the thread table when the system boots.

Standard non-interpreted programming languages compile human-readable source code into machine-readable code, or machine language code directly readable by the processor.

An interpreted language, on the other hand, compiles human-readable source code into an interpreter-readable code, or bytecode. A software program called an interpreter, written in machine language, later reads the bytecode and instructs the processor to perform the appropriate operations.

A key advantage of an interpreted language is that the bytecode can be designed so that it is machine independent, allowing a program written in the language and compiled into bytecode to run on any operating system and hardware platform that an interpreter has been written for.

When developing an interpreted language that must run identically on all platforms, relying on a platform's native multi-threading can be problematic at best. The goal of a cross-platform interpreted programming language is to make it possible to develop a program in the language on one platform, and then run that program unchanged on any other platform supported by the language. Java is one example of an attempt to create such a language.

Unfortunately, if such an application must multi-thread, use of native multi-threading capabilities immediately limits the platforms on which the application can run. The application program is immediately precluded from running on most versions of the MacOS (which has no threading ability), and depending on how many simultaneous threads of execution the application program requires, it may be precluded from running on Windows 95 (maximum of about 150–200 threads), BeOS (maximum of 4096 threads per processor), or other platforms.

SUMMARY OF THE INVENTION

The present invention is intended to solve above-identified problems and provide a multi-tasking capability to computers having different platforms and different operating systems. In accordance with the invention, platform-independent means multi-threading is accomplished by means of an interpreter, the software program that interprets the instructions that make up an interpreted programming language. The interpreter implements multi-tasking by creating, maintaining and processing in accordance with virtual threads. This solution eliminates the dependence on the platform-native threading capabilities and provides a reliable means of multi-threading cross-platform using an interpreted programming language.

In an typical interpreted programming language, every instruction in the program must be read by the interpreter and passed to the processor. This means that an interpreted program will typically run more slowly than a machine language program. Adding code to the interpreter to check a timer or counter at each machine code instruction, as done in conventional multi threading or time slicing, and perform a context switch when necessary would severely impact the performance of an interpreted program.

Accordingly, the present invention contemplates the performance of context switches only between successive pseudocode instructions and not during execution of a pseudocode instruction. Thus, a computer using multi-tasking or multi-threading as disclosed herein repeatedly executes the equivalent of many machine language instructions without making a check of a timer or counter.

A method for operating a computer comprises, in accordance with the present invention, storing in a computer memory a plurality of pseudocode instructions, at least some of the pseudocode instructions comprising a plurality of machine code instructions, and, for each of a plurality of tasks or jobs to be performed by the computer, automatically creating a respective virtual thread of execution context data including (a) a memory location of a next one of the pseudocode instructions to be executed in carrying out the respective task or job and (b) the values of any local variables required for carrying out the respective task or job. A plurality of the tasks or jobs each entails execution of a respective one of the pseudocode instructions comprising a plurality of machine language instructions. The method further comprises processing each of the tasks or jobs in a respective series of time slices or processing slots under the control of the respective virtual thread, and, in every context switch between different virtual threads, undertaking such context switch only after completed execution of a currently executing one of the pseudocode instructions.

Instead of taking the conventional "Virtual Machine" approach of mimicking the fine-grained machine language instructions (the approach used by Java), the virtual threading of the present invention uses an interpreted language with coarser instructions—that is, where each instruction accomplishes a much larger task.

For example, in machine language (or an interpreted language that mimics machine language), drawing a box may consist of several hundred or thousand instructions, each instruction setting the color of one of the pixels within the box.

With virtual threading, a single instruction is used to draw a box, and the interpreter handles the rest in machine language. This means that a checks for a potential context switch, made after every instruction, need only be performed once for the entire box-drawing operating, rather than after every pixel.

The result is that the interpreter can handle the multi-threading without a severe negative performance impact.

Pursuant to another feature of the present invention, each of the virtual threads is part of a respective linked list of virtual threads. Each of the virtual threads includes a pointer to a next virtual thread in the respective linked list. The computer method further comprises, for every context switch between different virtual threads, consulting the pointer of a currently executing virtual thread to determine an identity of a next virtual thread to be executed.

A common problem encountered by a platform-native threading implementation is the limitation on the number of threads (both active and idle) that can exist in the system at once.

In Windows 95/98, for example, if the total number threads in all applications passes about 150–200, the system becomes severely unstable. Behavior exhibited by test systems encountering this condition includes spontaneous reboots, random keyboard input, random mouse movement, memory corruption, and random application crashes.

One consequence of the coarser instruction set used by virtual threading is that context switch time is not as critical. This means that taking the extra time required to store threads in a linked list is acceptable, the result being that virtual threading allows a very large number of threads, limited only by the total memory available on the system.

The present invention contemplates that the virtual threads, which govern or intermediate the execution of tasks or jobs by the computer, are stored in a plurality of linked lists, including a list of idle virtual threads, a list of active virtual threads, and a list of queued virtual threads. The computer method further comprises periodically moving at least one virtual thread from the list of queued virtual threads to the list of active virtual threads. The moving of a virtual thread from the list of queued virtual threads to the list of active virtual threads generally includes (a) setting a mutex to lock the list of queued virtual threads, (b) subsequently modifying pointers in (i) the moved virtual thread, (ii) at least one virtual thread originally in the list of active virtual threads, and (iii) at least one virtual thread remaining in the list of queued virtual threads, and (c) thereafter resetting or releasing the mutex to enable access to the list of queued virtual threads.

Pursuant to another feature of the present invention, each of the virtual threads includes a mutex, while the computer method further comprises setting the mutex of a selected one of the virtual threads, subsequently modifying data in the selected virtual thread, and thereafter resetting or releasing the mutex to enable access to the selected virtual thread. The setting of the mutex of the selected thread, the modifying of the data, and the resetting or releasing of the mutex may be performed in response to a message from another one of the virtual threads. The modification of the data typically includes modifying a pointer of the selected virtual thread.

In accordance with a further feature of the present invention, each of the virtual threads is assigned a message queue, the computer method further comprising entering a message in a message queue of a selected one of the virtual threads during execution of a task or job pursuant to another one of the virtual threads. These threads may correspond to respective tasks or jobs derived from different applications programs, whereby the entering of the message in the message queue of the selected one of the virtual threads implements data transfer between the different applications programs. In another application of inter-thread messaging, the selected thread and the other thread are proxy or interface threads on different computers. In that case, the entering of the message in the message queue includes transmitting the message over a communications link between the computers. The communications link may be a private computer network or, for instance, the global computer network known as the Internet.

As implied above, the creating of the virtual threads, the processing of the tasks or jobs in respective series of time slices or processing slots, and the undertaking of context switches all include the operating of the computer under an interpreter program. The invention also contemplates the running of a plurality of instances of the interpreter program on the computer, each instance corresponding to a native thread. Each native thread creates a respective set of virtual threads of execution context data, processes each of a plurality of tasks or jobs in a respective series of time slices or processing slots under the control of the respective virtual thread, and in every context switch between different virtual threads, undertakes such context switch only after completed execution of a currently executing one of the pseudocode instructions.

The running of multiple native threads is preferably limited to a small number of threads on a single processor, for instance, one or two threads. Where a processor has inherent multi-threading capability, this limitation frees other platform-based native threads for handling of other applications programs.

Because Virtual Threading allows an unlimited number of threads to be created, and because the threads have very low overhead, a program written in a language that uses Virtual Threading can take advantage of a unique programming approach.

This programming approach involves the use of a large number of threads—one for each user interface device on the screen. A button, for example, has its own thread. A scroll bar has four—one for each of the buttons, one for the central bar, and one master thread. And threads are not limited to user interface devices—a server program, for example, could create one thread to service each client request.

A typical application may have anywhere from a hundred threads to a few thousand threads, depending on the nature of the application. With multiple applications running on a system, this would quickly exceed the native-threading abilities of Windows 95 (150–200 threads), and would negatively impact performance even on platforms with larger or unlimited threading capabilities. Virtual Threading, on the other hand, is specifically designed to deal with these problems, making it possible to run multiple applications with tens of thousands of threads without any performance problems.

This extensive use of threads greatly simplifies the creation of a complex application because the user interface code does not need to keep track of hundreds of user interface devices—each thread runs a simple program that keeps track of the single user interface device for which that thread is responsible.

This results in smaller programs that are simpler to create and easier to debug and maintain.

In accordance with another feature of the present invention, where a selected one of the virtual threads is in an idle state (e.g., in a linked list of idle threads), the computer method further comprises generating a message in response to an input from a source outside the computer, inserting the message in a message queue for the selected virtual thread, changing the selected thread from the idle state to an active state, thereafter accessing the message queue to obtain the message during a time slice or processing slot assigned to the selected thread. This process is that used to shift a virtual thread from inactive or idle status to active status pursuant to the occurrence of an event pertinent to the respective thread. That event may be generated by a source outside of the computer, for instance, by an operator actuating a keyboard key or by a communication from a remote computer.

Interpreter-mediated virtual threading in accordance with the present invention can prioritize among different tasks or jobs by any suitable technique. Where each of the virtual threads includes a thread priority, the computer method further comprises automatically consulting the thread priorities in a plurality of the virtual threads to determine relative priorities and varying a sequence of threads in accordance with the determined relative priorities. In one prioritizing technique, a given thread having a priority which is a integral number greater than the priority of a second thread is accorded a number time slices or processing slots which is that integral number greater than the number of time slices or processing slots accorded to the second thread.

The prioritizing of virtual threads (and concomitantly their respective tasks) provides an opportunity also for distributing processing load among different native threads, where more than one native thread is used. A thread may be allotted the task of redistributing virtual threads from native threads having more than an average priority of tasks to native threads having less than the average priority of threads. Generally, the shifting of threads is restricted to active threads.

As discussed elsewhere herein, the tasks or jobs processed in respective series of time slices or processing slots under the control of the respective virtual threads include controlling objects imaged on a computer display, each of the objects constituting a separate task or job assigned a respective one of the virtual threads. The processed tasks or jobs assigned to respective virtual threads by an interpreter pursuant to the present invention further include monitoring the actuation of keys on a computer keyboard. Each of the keys constitutes a separate task or job assigned a respective one of the virtual threads.

Preferably, the time slots or processing slots are measured by counting consecutively executed pseudocode instructions. The computer method further comprises, for each of a plurality of the time slices or processing slots, terminating the respective time slot or processing slot upon counting a predetermined number of consecutively executed pseudocode instructions.

A multi-tasking computer comprises, in accordance with a particular embodiment of the present invention, a memory, a display, an input peripheral, and at least one processor operatively connected to the memory, the display, and the input peripheral, the processor having a compiler for converting operator-entered source code instructions into bytecode or pseudocode instructions, the compiler being operatively linked to the memory for enabling the storage of the bytecode or pseudocode instructions therein. The processor also has an interpreter for executing the bytecode or pseudocode instructions. The memory stores a first linked list of idle virtual threads, a second linked list of active virtual threads, and a third linked list of queued or waiting virtual threads. Each of the threads including context or state data, a mutex and a pointer to a next thread in the respective list. The interpreter is operatively connected to the input peripheral for recognizing an event generated by the input peripheral and is operatively connected to the memory (a) for shifting at least one of the idle virtual threads from the first linked list to the third linked list, (b) for shifting queued or waiting virtual threads from the third linked list to the second linked list, (c) for executing instructions according to context and state data of different virtual threads in the second linked list in successive time slices or processing slots pursuant to a predetermined priority schedule. The interpreter is operatively connected to the display in part for modifying an object on the display in response to instructions specified by a respective active virtual thread in the second linked list.

The memory may additionally store a fourth linked list of native threads. In that case, the interpreter is one of a plurality of instances of a common interpreter, each of the instances of the common interpreter corresponding to a respective one of the native threads. Also, the second linked list is one of a plurality of linked active-thread lists, each of the native threads being linked by a respective pointer to a respective one of the linked active-thread lists, while the third linked list is one of a plurality of linked queued-thread lists, each of the native threads being linked by a respective pointer to a respective one of the linked queued-thread lists.

Pursuant to another particular feature of the present invention, the interpreter includes programmed circuitry for shifting a virtual thread from a first native thread having a heavier-than-average load to a second native thread having a lighter-than-average load.

The list or table of idle virtual threads preferably includes a plurality of threads assigned to respective keys of a keyboard for processing actuations of the respective keys. The list or table of idle threads may additionally include a plurality of threads assigned to respective objects in a display image for processing changes in appearance of the respective objects.

Where the interpreter includes a context switch module and a instruction counter, the context switch module is operatively connected to the memory and the instruction counter for effectuating a context switch from a currently executing active thread of the second linked list to a next active thread in the second linked list upon execution of a predetermined number of bytecode or pseudocode instructions pursuant to the currently executing active thread.

Each of the virtual threads includes a memory location of a next instruction to execute in the respective thread, values of any local variables for the respective thread, and an execution priority for the respective thread.

In accordance with further features of the present invention, the memory stores a plurality of message queues assigned to respective ones of the threads and also stores at least one proxy or interface thread having an execution context for carrying out a communication with a remote computer via a communications link. Where the communications link is a computer network such as the Internet, the proxy or interface thread contains a memory address leading to a network protocol routine.

A multi-tasking computer comprises, in accordance with another embodiment of the present invention, a memory storing state and context data of multiple threads or tasks and an interpreter for executing a series of bytecode instructions each consisting of a multiplicity of machine code steps, the interpreter being programmed to define a respective virtual thread for each task to be performed by the computer, to execute bytecode instructions of a respective current thread selected from among the virtual threads during each time slice of a series of consecutive time slices, and to execute a context switch from one of said virtual threads to another of the virtual threads only after execution of one of the bytecode instructions.

Various advantages provided by the present invention will be apparent from the descriptions hereof.

DEFINITIONS

Figure 1:
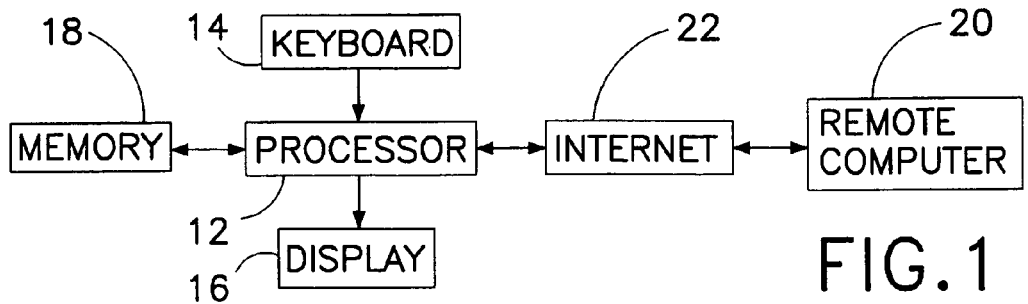
FIG. 1 is a block diagram of a computer system incorporating a virtual threading capability in accordance with the present invention.

The term "multi-tasking" is used herein to refer to the performance of multiple tasks simultaneously by a computer.

The term "pseudocode" as used herein refers to computer instructions compiled for execution by an interpreter. An interpreter is a program which serves to translate into machine language pseudocode programs and to perform the indicated operations as they are translated. "Pseudocode" is unrelated to the hardware of a particular computer and requires conversion to the code used by the computer before the program can be used. Many pseudocode instructions entail the execution of multiple machine language instructions. Pseudocode is sometimes referred to as "bytecode."

The term "task" or "job" is used herein to denote any function performed by a computer. The tasks or jobs may vary in scale from a simple operation such as changing the contents of a processor register to large complex operations requiring the execution of many pseudocode instructions. Examples of tasks or jobs include (a) the monitoring of user input peripherals such as keyboards and individual keys thereof, (b) the generation and modification of objects on a monitor or display, such as menu buttons, windows, scroll bars, icons, and background patterns, (c) communication with remote computers over a network or other communications link, (d) applications programs such as a word processor, a spread sheet, a multimedia player, a calculator, etc., and (e) various components or functions of applications programs, such as editing, printing, spell check, and other functions of a word processor.

The term "time slice" or "processing slot" is used herein to denote a segment of processor time. In conventional multi-tasking computers, all time slices are equal in duration, being measured by a time base or timer interrupt. Pursuant to the instant disclosure, time slices or processing slots are measured either by a timer as in conventional multi-tasking computers or by instruction counting. In the latter alternative, the time slices or processing slots are not necessary all of equal duration.

As used herein, the word "thread" refers to an execution context for implementing or carrying out a job or task by a computer, the execution context being used or followed in a series of time slices or processing slots. The term "virtual thread" as used herein refers to a thread which is created by, stored, modified, processed, and followed by an interpreter. The term "native thread" is used herein to designate a thread built into the operating system of a particular computer. Where a computer operating system has multiple native threading capabilities, a plurality of native threads can be used, each such native thread running a respective instance of the interpreter.

The term "mutex" as used herein refers to a lockable object which can be set or locked by one thread at a time to prevent access by another thread to a program, a virtual thread, a memory area, or other component of a computer system. A mutex is used by native threading implementations to synchronize access to data that is shared between threads. Use of mutexes is important because such use prevents conflicts between multiple threads attempting to modify the same data at the same time. A mutex is used to represent shared data; a thread must lock the mutex before attempting to access the data.

A "linked list" is a commonly used structure in the software industry where each entry in the list contains the memory address of the next entry in the list. This linking permits entries to be inserted in or deleted from the list without moving other entries in the list. A deletion of an item simply involves changing the item's predecessor so that the predecessor points to the address of the item's successor, thus freeing the memory used by the item.

The term "context switch" is used herein to designate a process wherein a currently executing thread is interrupted, that thread's state or execution context is stored, a new thread is selected to run, the new thread's saved execution context is restored and followed in immediately subsequent computer operations.

DESCRIPTION OF THE PREFERRED EMBODIMENTS

Figure 2:
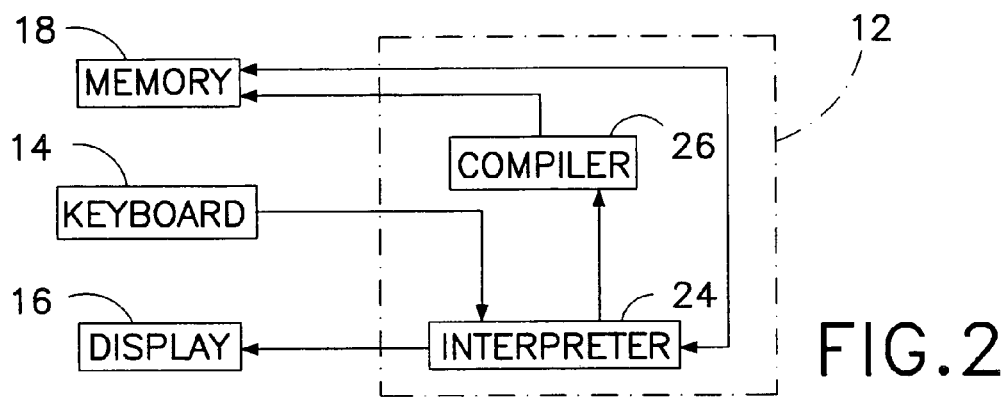
FIG. 2 is a block diagram of selected components of a processor shown in FIG. 1, showing connections of those components to other elements of the system of FIG. 1.

As illustrated in FIG. 1, a computer system includes a processor 12, a keyboard 14, a display 16, and a memory 18. Processor 12 is connected to a remote computer 20 via a computer network such as the Internet 22. As shown in FIG. 2, processor 12 includes an interpreter 24 typically implemented as generic digital computer circuits modified by programming to undertake multiple computer functions, including the interpretation of keyboard actuation and the control of display 16 and particularly the appearance of objects thereon in response to commands input by a user via keyboard 14 or in response to communications received from computer 20 over the Internet 22. Processor 12 also includes a compiler 26 (which may be part of the interpreter 24) for converting human-originated source code into bytecode or pseudocode which is stored in memory 18.

Figure 3:
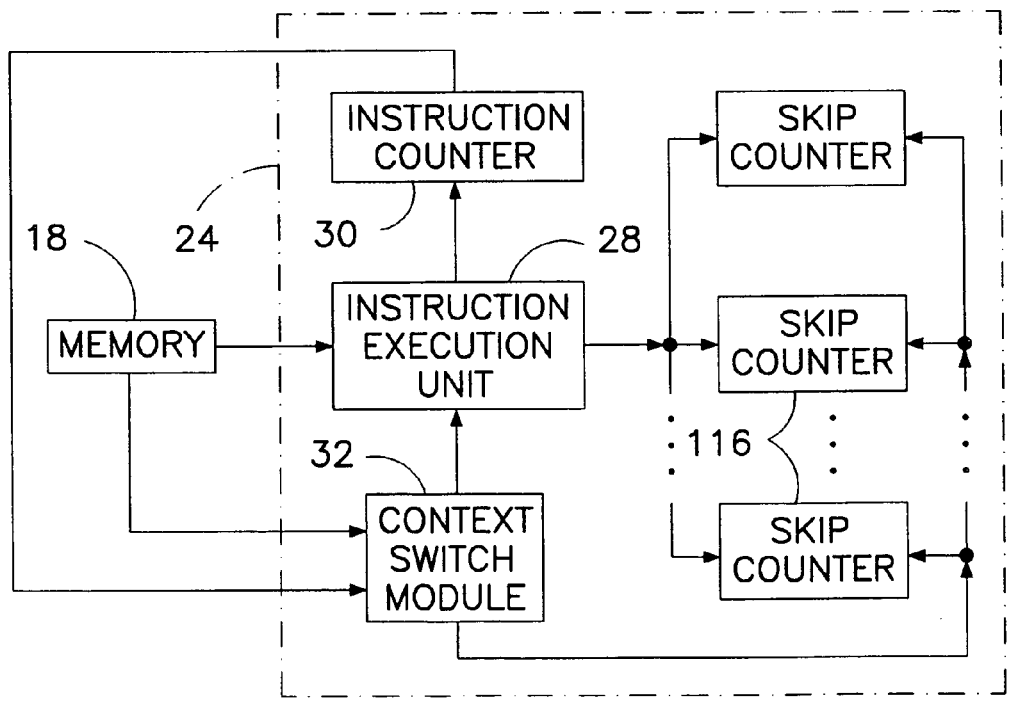
FIG. 3 is a block diagram of selected components of an interpreter shown in FIG. 2.

As shown in FIG. 3, interpreter 24 includes a code execution unit 28 operatively connected to memory 18 for reading the bytecode and performing operations in accordance with the bytecode. Interpreter 24 further includes an instruction counter 30 connected to execution unit 28 for tracking the number of bytecode instructions processed in a current time slice or processing slot. Counter 30 is operatively connected to a context switch module 32 in turn connected to execution unit 28 for inducing a change in execution context of the interpreter 24 upon the counting of a predetermined number of byte-code instructions by unit 28. An execution switch can occur earlier, that is, prior to the completion of counting, under certain circumstances, for instance, if a wait state is entered.

In much of the following discussion, it is assumed that interpreter 24 is dealing only with compiled bytecode. In reality, compiler 26 (which may be a component of the interpreter, or a separate program) is necessary to translate humanly readable source code into bytecode. Compilers are standard in the software industry (C, C++, Basic, Pascal, Java, and many other languages must be compiled before they can be run) and techniques for writing compilers are common knowledge for many programmers. Accordingly, further discussion of compiler 26 is omitted from the instant disclosure.

Interpreter 24 implements multi-tasking through the creation and linking of virtual threads and the carrying out of tasks in respective series of time slices or processing slots in accordance with or under the control of the respective virtual threads. It will be assumed hereinafter that interpreter 24 is a stack-based interpreter. In practice, virtual threading will work with any type of interpreter, whether its stack-based or otherwise.

Consider the following bytecode, which draws a box between the coordinates x=10, y=10 and x=20, y=20 on the screen of computer display 16:

| INSTRUCTION | PARAMETER |
| --- | --- |
| PUSH INTEGER | 10 |
| PUSH INTEGER | 10 |
| PUSH INTEGER | 20 |
| PUSH INTEGER | 20 |
| DRAW BOX | |

In a stack-based language, the first four instructions push the values 10, 10, 20 and 20 onto the stack. The DRAW BOX instruction removes the top four values from the stack and uses them as coordinates to draw a box.

This bytecode instruction will be used as an example program in following discussions of interpreter 24 and virtual threading.

Virtual Threads

A virtual thread is basically an execution context, nothing more. An execution context consists of (a) the memory location of the next instruction to execute in the thread, (b) the values of any local variables for the thread, (c) the call stack for the thread, (d) the thread priority and other attributes, and (e) any other data that the programming language must store on a per-thread basis, such as error state data. The bytecode is not part of the thread; several threads can be running the same bytecode simultaneously. The thread simply maintains a pointer to the next bytecode instruction in memory that it will execute.

A thread can be in one of four states:

(1) Idle: Idle virtual threads are threads that temporarily have nothing to do. For example, a thread that is waiting for user input, such as a key press, is idle, as is a thread that's waiting for a timer to expire. Idle threads are stored in a separate list from active threads and do not take up any processor time.

(2) Queued: The virtual thread is ready to become active and has been assigned to one of the native threads that is running an interpreter, but the native thread is busy executing an instruction and cannot move the virtual thread into its active list until it finishes the instruction.

(3) Active: The virtual thread is in the active list of a native thread, and is one of the virtual threads that receives time slices from the native thread.

(4) Current: A current virtual thread is always also an active virtual thread. A current virtual thread is a virtual thread that is currently executing—that is, a native thread has given it a time slice and it is within that time slice.

Linked Thread Lists

Figure 4:
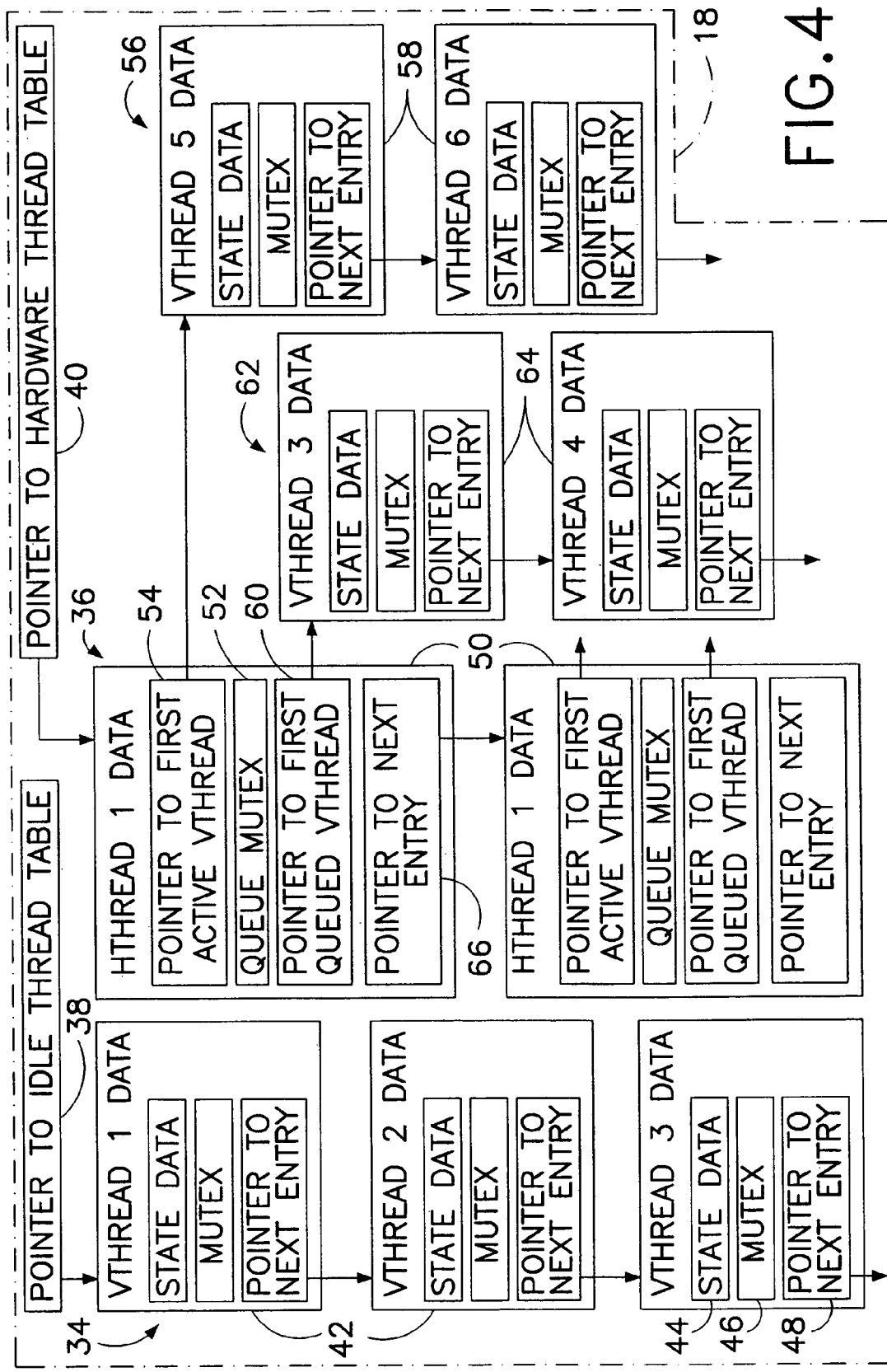
FIG. 4 is a diagram of thread state data stored in memory, showing the linked list structure of the data.

As illustrated in FIG. 4, interpreter 24 stores thread state and context data in memory 18 as a set of linked lists. There are two primary linked lists: an idle thread table 34 and a native thread table 36. Pointers 38 and 40 to the first entry of each of these lists 34 and 36 are stored in global variables in interpreter 24.

Idle thread table 34 stores a list of all the idle virtual threads 42 in the system. These threads 42 remain in the idle table 34 until respective events occur that cause the threads to be reactivated. Each entry or virtual thread 42 in the idle table 34 contains the thread's state and context data 44, a mutex 46 used to control access to the thread's state and context data, and a pointer 48 containing the memory address of the next entry in the list.

Native thread table 36 contains an entry for each native thread 50 that is running an instance of interpreter 24 and that can accept virtual threads for execution. On platforms such as some versions of MacOS where there is no native threading capability, there is only one entry in the native thread table 36. Each entry 50 in the native thread table 36 contains one mutex 52, a pointer 54 to a linked list 56 of active virtual threads 58, another pointer 60 to a linked list 62 of queued or waiting virtual threads 64, and a further pointer 66 to the next entry in the native thread list 36.

Linked lists 56 and 62 of virtual threads 58 and 64 use the same format as linked list 34 of idle virtual threads 42, while the individual active threads 58 and individual queued threads 64 have the same structure as idle threads 42. Each native thread 50 periodically moves threads from the respective linked list 62 of queued virtual threads 64 to the respective linked list 56 of active virtual threads 58. A native thread 50 does not use its queued threads 64 while the native thread is executing instructions (via execution unit 28), so the respective linked list 62 may be locked and threads may be placed in the queue without having to lock the native thread's active list 56, thus improving performance on multi-processor systems.

Mutex 52 is used to synchronize access to the respective linked list 62 of queued virtual threads 64. A native thread 50 (either the owner or another native thread) must have a lock on the respective mutex 52 before access can be obtained to the respective queue 62. The rest of the thread structure shown in FIG. 4 does not require a mutex because the only thread with access capability is the respective native thread.

Interpreter 24 spends most of its time (as does any interpreter) in a loop such as that shown in FIGS. 5A through 5F. Within this loop, interpreter 24 performs a number of operations to support virtual threading.

OS Maintenance Tasks

One of the tasks the interpreter 24 must perform periodically is operating system maintenance 70. The details of this task vary depending on the platform. Typically, only one native thread 50 needs to perform maintenance tasks 70, while other native threads simply execute bytecode instruction. On some platforms, a completely separate native thread can be used for maintenance, and all native threads 50 in the native thread table 36 can be dedicated to bytecode execution. On the other hand, platforms without native threading capability (that is, cooperatively multi-tasking systems such as MacOS versions prior to OS X) must perform maintenance tasks periodically in order to allow other tasks on the system time to run.

Typical tasks performed as part of operating system maintenance tasks 70 include performing one iteration of the operating system's event loop (such as calling GetNextEvent( ) on MacOS platforms, or PeekMessage( )/GetMessage( )/Translate Message( )/DispatchMessage( ) on Windows platforms).

Event Processing

After the performance of maintenance tasks 70, interpreter 24 and particularly instruction execution unit 28 thereof makes an inquiry 72 as to whether there are any virtual threads in the active thread list 56 of the native thread 50. Where there is at least one active thread 58 in active thread list 56, interpreter 24 undertakes an active check 74 for events. Where there are no active threads 58 in list 56, interpreter 24 waits for an event at 76, thus relinquishing processor time to other applications on the system.

When an event occurs, the event is encoded as a message and placed into a message queue for the appropriate virtual thread. Each virtual thread may be provided with its own message queue. If the relevant virtual thread is an idle thread 42, it must be reactivated, which involves finding a native thread 50 to which the idle thread is to be assigned as a queued or waiting thread 64.

Figure 5A:
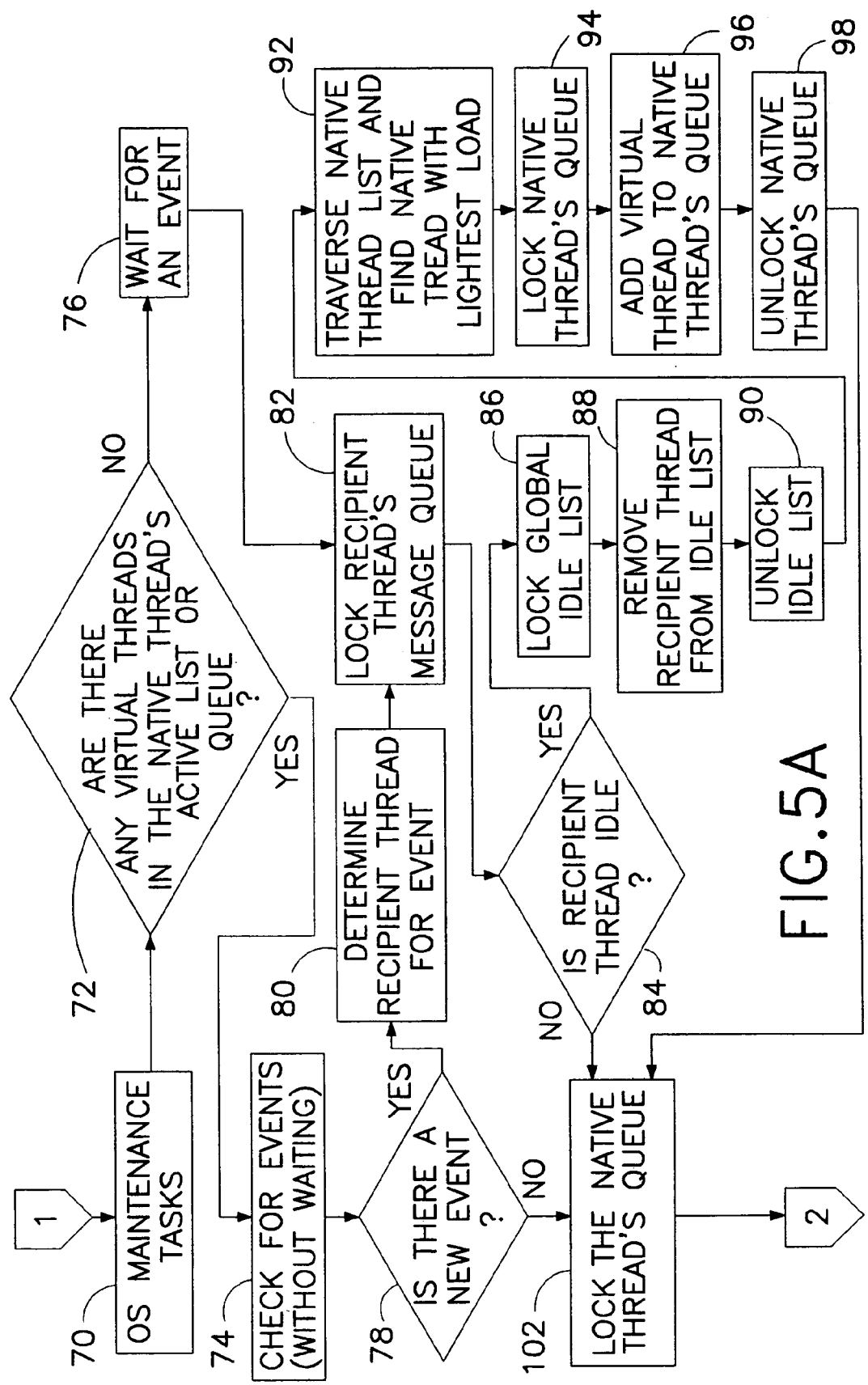
FIGS. 5A through 5F are a flow chart showing selected operations performed by the interpreter of FIG. 2.

As shown in FIG. 5A, if event check 74 results in a detected event, as ascertained by interpreter 24 at a decision junction 78, interpreter 24 identifies the recipient thread in a step 80 and then locks the recipient thread's message queue in a step 82. This lock is also undertaken by interpreter 24 upon receiving notification of an event in step 76. Subsequently, interpreter 24 investigates at 84 whether the recipient thread is an idle thread. If the recipient thread is an idle thread 42, as determined by interpreter 24 in investigation 84, the global idle thread list 34 is locked (mutex not shown) in a step 86. The recipient thread is then removed from the linked list 34 of idle threads 42 in a step 88. This removal generally entails altering the pointer 48 of the virtual thread immediately preceding the recipient thread in the idle thread list 34 so that that pointer identifies the virtual thread immediately following the recipient thread in the idle thread list 34.

After the removal of the recipient thread from linked idle thread list 34 in step 88, interpreter 24 locks that list 34 in a step 90. In a subsequent step 92, interpreter 24 scans or traverses linked list 36 of native threads 50 to find the native thread with the lightest load. Native thread load can be calculated as the number of virtual threads assigned to the native thread, although it's generally better to calculate the load more accurately by summing the priorities of all the native threads assigned to a physical thread (that is, all the native threads in the physical thread's active list and queue). The queue mutex 52 of the native thread 50 selected as having the lightest load is locked by interpreter 24 in a step 94. The recipient virtual thread just removed from idle thread list 34 is then added to the queued thread list 62 of the selected native thread 50 in a step 96 and the respective mutex 52 then unlocked in a step 98. The adding of the recipient virtual thread to queued thread list 56 entails the modification of two pointers, in the recipient thread and a thread immediately preceding the recipient thread in the queued thread list 56 upon insertion of the recipient thread therein.

If the recipient thread is not an inactive or idle thread 42, as determined by interpreter 24 in investigation 84, the interpreter commences a routine 100 (FIG. 5B) for transferring a queued thread 64 from linked list 62 to the associated active thread list 56. Routine 100 is also undertaken by interpreter 24 upon transfer of a recipient thread from the idle thread list 34 to the queued thread list 56 of the least busy native thread 50. In a first step 102 of routine 100, interpreter 24 locks the native thread's queue mutex 52. The interpreter 24 then checks at 104 whether the queued thread list 62 contains at least one virtual thread 64. If so, the first thread in the queue is removed from the queue in a step 106 and added to the respective active thread list 56 in a step 108. Again, this shifting of a virtual thread from one list to another merely entails an alteration in three pointers, that of the moved thread and those of the immediately preceding threads in the two lists. After shifting of the thread, interpreter 24 decides at a junction 110 whether the newly transferred virtual thread is in a higher priority group than the currently executing thread. If so, a context switch is performed by interpreter 24 and particularly by module 32 (FIG. 3) in a step 112 so that the newly shifted thread becomes the currently executing thread. Queue mutex 52 is then unlocked in a step 114.

Timer Processing

Timer processing is not included in the flow chart of FIGS. 5A through 5F as timer processing is not a critical part of virtual threading. An interpreted language will, however, typically need to provide developers with a means of setting timers.

The most efficient way to implement timers with virtual threading is to keep in memory 18 a global list of all timers. The list should be sorted so that the timers that will expire soonest appear at the beginning of the list.

Each time the main interpreter loop (FIGS. 5A through 5F) iterates, usually during event processing, interpreter 24 should check the first entry in the timer list to see if that entry has expired (if it hasn't, no other timer has expired because the timers later in the list expire after the first one in the list). If the timer has expired, it should be removed from the list and an event should be generated. The event will cause the appropriate virtual thread to be activated (if it's not already active), and that thread will find the timer expiration event when the thread checks its queue.

If there are no virtual threads assigned to a native thread and the native thread consequently waits for events (step 76) instead of checking for events (step 74), the interpreter 24 must check timers before waiting for events. If there are any timers in the list, the interpreter must set an operating system timer so that the operating system generates an event to release the wait when the timer expires.

It is also important to note that different operating systems have different degrees of accuracy in their timers. If the remaining time on the first timer in the list is less than the accuracy of the operating system's timer, the interpreter 24 may not wait for messages but must instead check for messages so that time expiration event are generated with the requisite accuracy.

Inter-Thread Messages

Typically, virtual threads will need some means of communication so they can exchange data with each other.

Native threads in conventional multi-tasking computer systems usually share data by placing the data in memory so that the data is accessible to all threads and then locking access to the memory to prevent multiple threads from accessing the data simultaneously. The virtual threading described herein uses a different approach, which is the exchange of messages between threads. A message consists of a message identifier which uniquely identifies the type of message (for example, the string "mouse-move" could be a message identifier) and a block of data. The block of data may be of any format and may be any size (although enormous blocks several megabytes in size are not recommended for performance reasons; a series of smaller messages are preferred in such cases).

A message can be generated in response to an external event received from the operating system (including user input events such as mouse movement, key presses, etc.) or in response to an instruction in a virtual thread's bytecode.

The event processing section of the flow chart of FIG. 5A shows how a message is added to a thread's message queue in response to an event. The same technique is used for adding a message to a thread's message queue in response to a bytecode instruction, with one exception: In the case where a thread is placing a message in its own message queue, care must be taken to avoid locking portions of the thread's context that are already locked as part of the bytecode instruction execution; attempting to lock in both places may cause a deadlock depending on the platform's implementation of mutexes.

Moving Threads from Activity Queue to Active List

When a virtual thread is activated in response to a message or an event, the virtual thread is placed into the queued thread list 62 of the appropriate native thread 50 rather than directly into that native thread's active thread list 56. This is done because the native thread's active list 56 should only be accessed by the native thread itself so that list 56 doesn't have to be locked. Avoiding the need to lock the native thread's active list 56 and only locking the queued thread list 62 improves performance because the native thread 50 may be busy executing an instruction, and the native thread that's performing the activation (which may be a different thread running asynchronously on a different processor) doesn't have to wait for the instruction execution to complete.

A native thread is therefore responsible for periodically moving threads from its activity queue to its active list.

Context Switching

Each native thread 50 stores a pointer (e.g., pointer 54) to the currently executing virtual thread, in the native thread's entry in the native thread list 36. A context switch merely involves changing this pointer to point to a different virtual thread 58 in the active thread list 56. The instruction execution code as carried out by instruction execution unit 28 (FIG. 3) uses the thread context in the virtual thread list entry at that pointer address, so no other action is necessary for a context switch. This means that a context switch operating is very fast, but execution of instructions tends to be slightly slower than usual because of the pointer indirection.

Thread Priorities

Each virtual thread 42, 58, 64 has an assigned priority. If multiple threads are active at the same time, i.e., if active thread list 56 contains more than one thread 58, the thread with the higher priority will receive more processor time.

One of the key uses of thread priorities is to give precedence to threads that respond to user input. This precedence enables interpreter 24, for example, to modify an object 202 on display 16 (FIG. 2) immediately upon the actuation of a key on keyboard 14 by an operator. Thus, the operator receives immediate feedback from the computer indicating that his or her instruction has been received and is being processed. The user thus knows that keyboard 14 and processor 12 are working and have not been frozen or otherwise disabled.

For example, consider an application with a "Print" button shown as object 202 on display 16. The button 202, being a user input device, is assigned its own virtual thread 42, 58, 64. The button's thread spends most of its time in the idle thread list 34. When the user clicks on the button (a mouse click is a user input event), the thread is activated. The thread must then re-draw the button 202 so it looks "pressed in" as at 204, after which the thread sends a message to some other thread to notify that other thread that the button was pressed; the other thread will then do whatever is necessary, such as printing a document.

By having the button thread assigned a higher priority than the priorities of other tasks of the application, the user can be assured that when he or she clicks the button there will be an immediate visual response (the button is re-drawn to look "pressed in") even if the system is busy handling other tasks.

A simple priority system, embodied in the flow chart of FIGS. 5A through 5F, works by assigning each thread a numerical value for its priority. Typically, this value is between 0 and 100, with larger values indicating higher priorities, but any range of values can be used. In this simple priority system, a given active thread 58 will not be allotted any processor time if there are any higher priority threads in the respective active thread list 56. Each native thread 50 in this system keeps track of the priority level of the highest priority virtual thread 58 in its active list 56 (this priority level can be called the highest active priority). When a native thread 50 performs a context switch and must select a new virtual thread 58 to become the current virtual thread, the native thread 50 always selects the next virtual thread in the list 56 that is at the highest active priority, starting over from the beginning of the list when the native thread reaches the end of the list. Each native thread 50 also keeps track of the number of active virtual threads 58 at the highest active priority.

In this simple priority system, whenever a native thread 50 moves a virtual thread from the respective queued thread list 62 to the respective active thread list 56, if that virtual thread is of a higher priority than the highest active priority, the highest active priority is adjusted to the priority of the new thread, the count of threads at the highest active priority is set to 1, and a context switch is performed to make the new thread the current virtual thread. If the new virtual thread has a priority equal to the highest active priority, the count of threads at the highest active priority is simply incremented.

Whenever an active virtual thread 58 terminates or becomes idle, the respective native thread 50 decrements the count of threads at the highest active priority level. If the count reaches zero, the native thread 50 scans its active list 56 to determine the new highest active priority and the new count of threads at that priority, and performs a context switch to make the appropriate thread the new current virtual thread.

Finally, if the priority level of an active virtual thread 58 increases and the new priority is higher than the current highest active priority, the highest priority must be adjusted and that thread must become the new current thread, and similarly, if the priority level of an active virtual thread 58 decreases, if that virtual thread was previously at the highest priority level, the respective native thread 50 must scan its active list 56 to determine the new highest active priority and the new count of threads at that priority, and then performs a context switch to make the appropriate thread the new current virtual thread. Priority levels can change as a result of instructions that are executed by the interpreter 24.

Advanced Thread Priorities

A more advanced system can be used for thread priorities, but is not absolutely necessary for virtual threading to work. This more advanced system makes it possible for a thread 58 to get processor time even if a higher priority thread is active.

This is done by using priority groups.

In a typical implementation, a thread's priority would be a value between −9999 and +9999, inclusive. A thread's priority group is equal to the thread's priority divided by 100, discarding fractions, so for example:

| Priority Group | Lowest Priority in Group | Highest Priority in Group |
| --- | --- | --- |
| −3 | −399 | −300 |
| −2 | −299 | −200 |
| −1 | −199 | −100 |
| 0 | −99 | +99 |
| 1 | 100 | 199 |
| 2 | 200 | 299 |
| 3 | 300 | 399 |

The rules from the simple thread priority system described in the previous section are still used, but those rules apply instead to priority groups. Thus, a given active thread 58 will not receive any processor time if there is an active thread in a higher priority group. Threads 58 within the same priority group, however, will receive processor time based on their priorities within the group. Thread priorities are relative. Given two priorities P and Q, a thread of priority P will receive one time slice for every (Q−P)+1 time slices that a thread of priority Q receives. Therefore, a thread of priority N will get one time slice for every 4 time slices that a thread of priority N+3 gets.

For example, consider the following set of threads:

| Thread ID | Thread Priority |
| --- | --- |
| A | 50 |
| B | 120 |
| C | 121 |
| D | 122 |
| E | 124 |

If all of these threads are active at once, thread A will not run because it is in a lower priority group than the other threads. The remaining threads will be allocated time slices as follows:

B C D EEE D EEE C D EEE D EEE B C D EEE D EEE C D EEE D EEE

In other words, out of every 38 time slices, thread B will receive 2 time slices, thread C will receive 4, thread D will receive 8, and thread E will receive 24.

This time slice allotment is implemented by maintaining a skip counter 116 for each active virtual thread 58 (see FIG. 3). Each counter 116 has an initial value of zero. Whenever a context switch occurs and a new thread 58 must be selected for execution, the selected thread will naturally be in the highest priority group. The selected thread may not, however, be the highest priority thread that's active; there may be another higher priority thread in the same priority group. Therefore, if H is the priority of the active thread 58 with the highest priority, and the P is the priority of the active thread that has been selected as the new current virtual thread for the context switch operation, and S is the value of the skip counter (initially zero) for the new current virtual thread, then if S≧(H−P), then the context switch will happen normally. Otherwise, the respective skip counter 116 is incremented, the thread is skipped, and a different active thread 58 is selected to be the current thread.

Figure 5B:
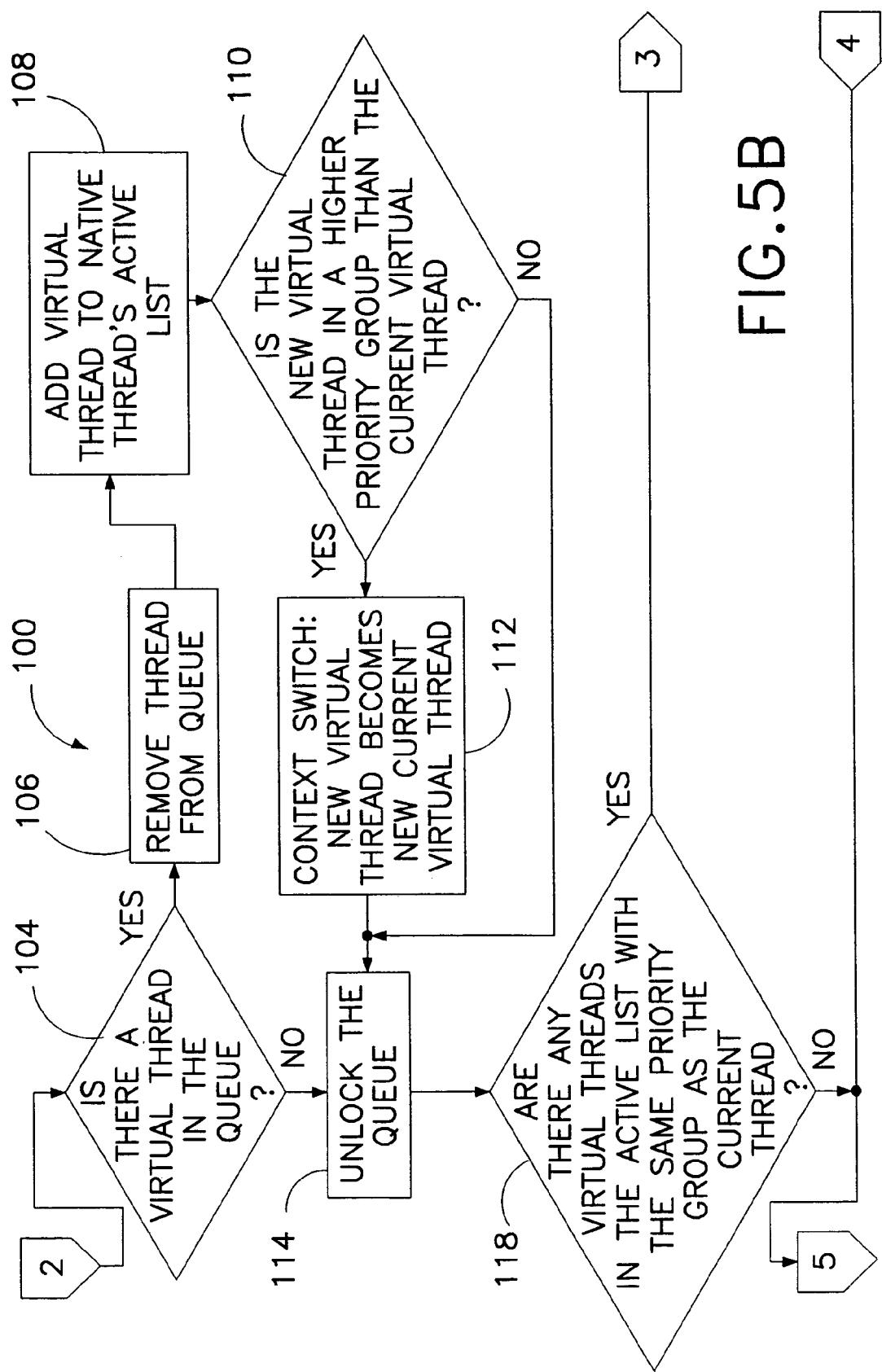
Figure 5C:
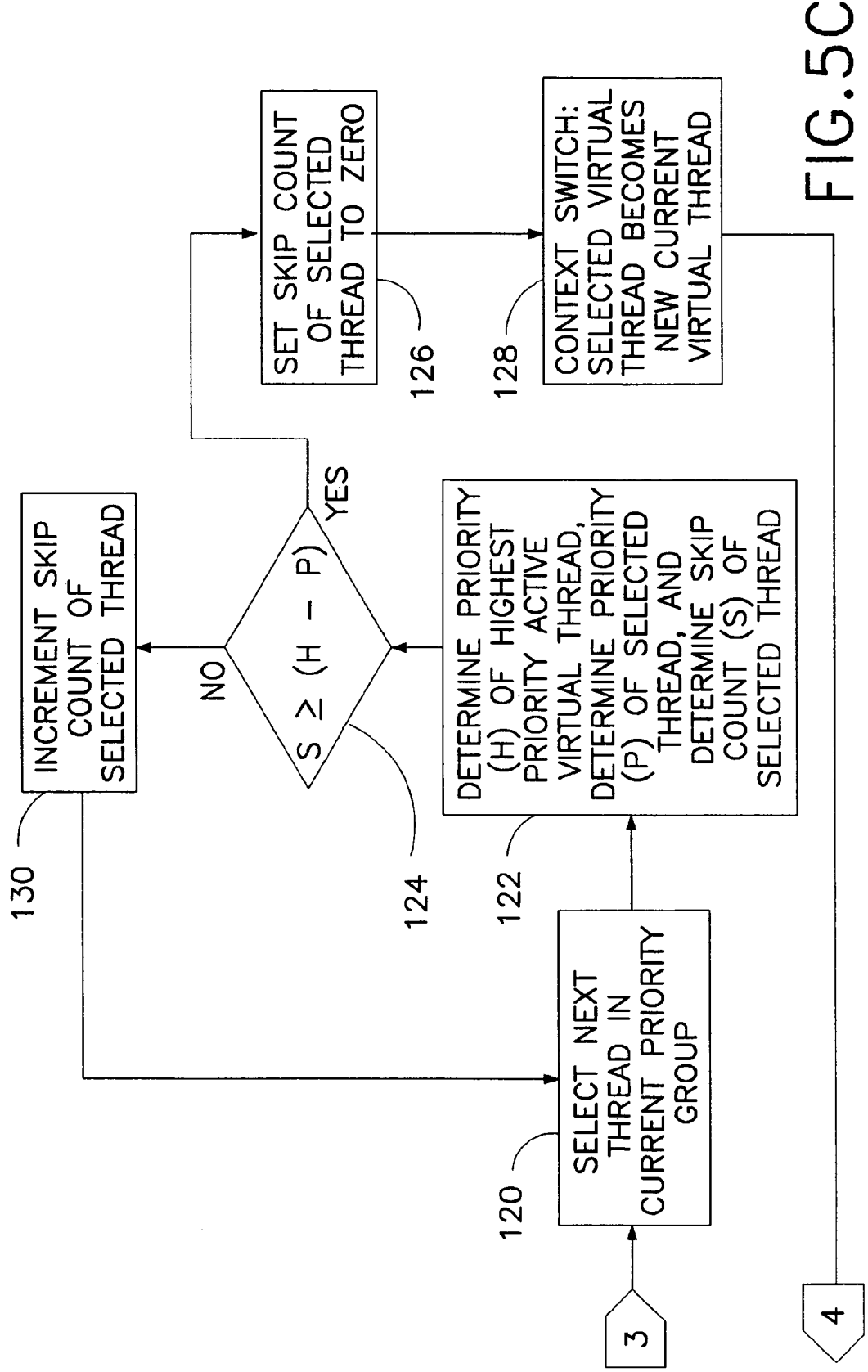
Figure 5D:
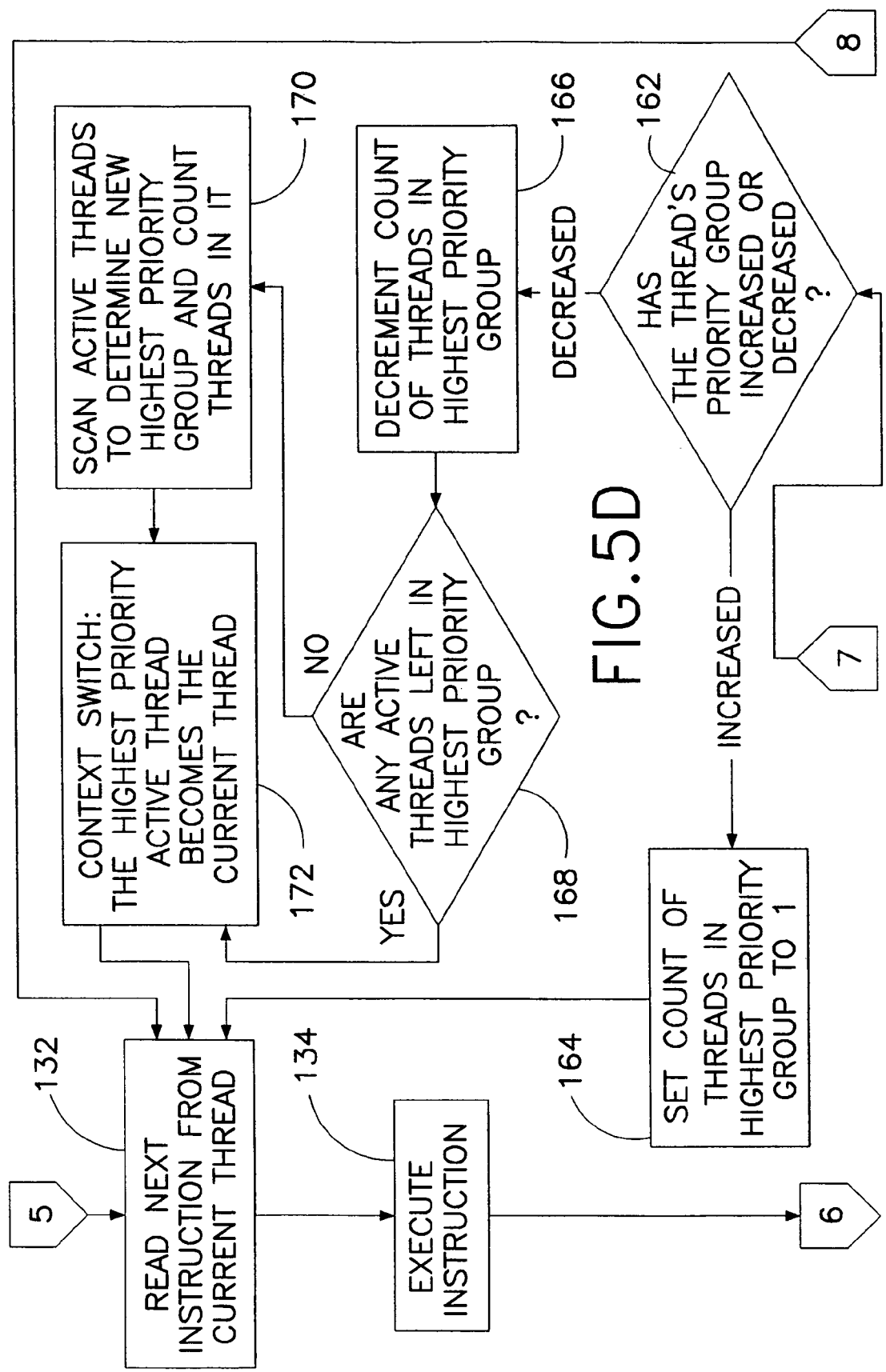
Figure 5E:
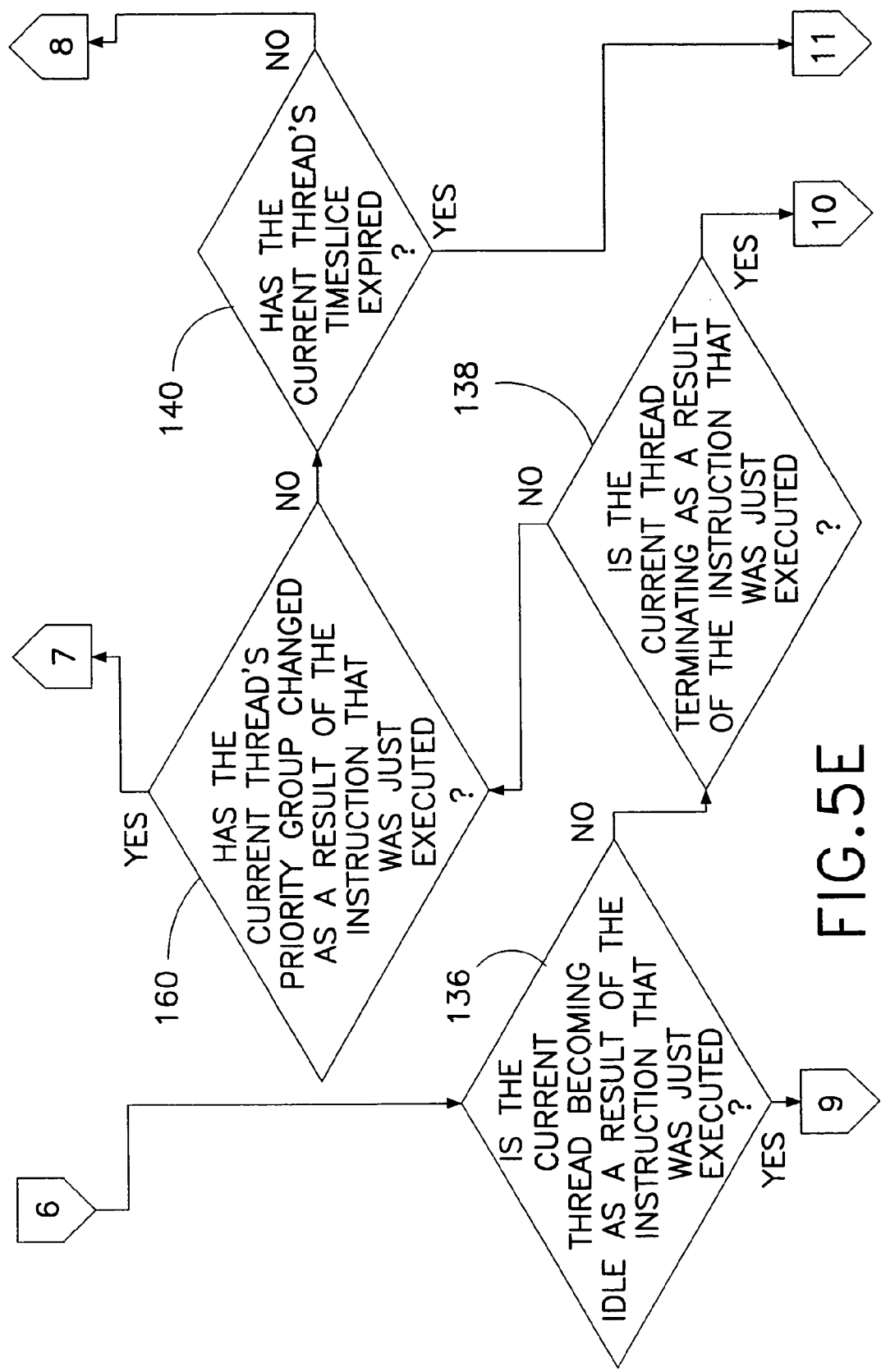

This procedure is illustrated in FIGS. 5B and 5C. The interpreter 24 first makes a check 118 as to whether, in the respective list 56 of active virtual threads 58, there are any threads of the same priority group as the current thread. An affirmative outcome leads the interpreter 24 to select the next thread in the current priority group in a step 120 (FIG. 5C). As discussed above, the interpeter 24 then determines, in a step 122, the priority H of the highest priority active virtual thread in the current priority group, the priority P of the selected thread, and the skip count S of the selected thread. At a subsequent decision junction 124, the interpreter 24 inquires whether the skip count S is greater than or equal to the difference between the priority H of the highest priority active virtual thread in the current priority group and the priority P of the selected thread. If the skip count S is greater than or equal to the difference H–P, the interpreter 24 resets the skip counter 116 of the selected thread back to zero in a step 126 and makes a context switch in a step 128. The selected thread has now become the currently executing thread. If the skip count S is less than the difference H–P, the interpreter 24 increments the contents of the skip counter 116 of the selected thread in a step 130 and returns to step 120 to select another thread in the current priority group of the active thread list 56.

By basing everything on the relative priorities of the threads 58 rather than the absolute priorities, the same number of skip operations will occur for a pair of threads with priorities 10 and 20 as for a pair of thread with priorities 510 and 520—in either case, the priority difference is 10, so the thread with the lower priority will receive one time slice for every ten time slices the higher priority thread receives.

Instruction Execution

During a time slice of an active virtual thread 58, the interpreter 24, and more particularly instruction execution unit 28, of the native thread 50 to which that virtual thread has been assigned repeatedly reads (step 132) (FIG. 5D) and executes (step 134) instructions from the virtual thread, as quickly as possible. After executing each instruction in step 134, the native thread 50 (i.e., respective instance of the interpreter 24) makes a series of checks 136, 138, 140 (FIG. 5E) to determine whether the current virtual thread is becoming idle as a result of the instruction, whether the current thread is terminating as a result of the instruction that was just executed, or whether the virtual thread's time slice has expired. If any of these conditions is true, the native thread 50 or respective interpreter 24 stops executing instructions from that virtual thread until that thread becomes active or is assigned a new time slice.

A time slice or processing slot can be measured either using a timer or an instruction count, the latter being tracked by instruction counter 30 (FIG. 3). In general, it is better to use an instruction count because the overhead at each instruction is much lower: Checking if a time slice has expired consists merely of incrementing a counter variable, then testing if the counter variable has passed the maximum number of instructions for the time slice. Comparison of the instruction count with a predetermined count maximum may be undertaken by context switch module 32 (FIG. 3).

Selecting the correct size for a time slice recognizes that longer time slices make more efficient use of the processor 12 (thereby getting the work done faster), but decrease the number of context switches that can happen within a given period of time, which can result in erratic performance for user interfaces. Depending on the underlying operating system and hardware platform, and the nature of the application, different sizes for time slices may make sense. Typically a value of between 20 and 200 instructions per time slice works well. Making the time slice too small (1 to 3 instructions) severely impacts performance, and making the time slice too big (millions of instructions) essentially defeats the purpose of multi-threading, particularly for any kind of application with a graphical user interface.

Figure 5F:
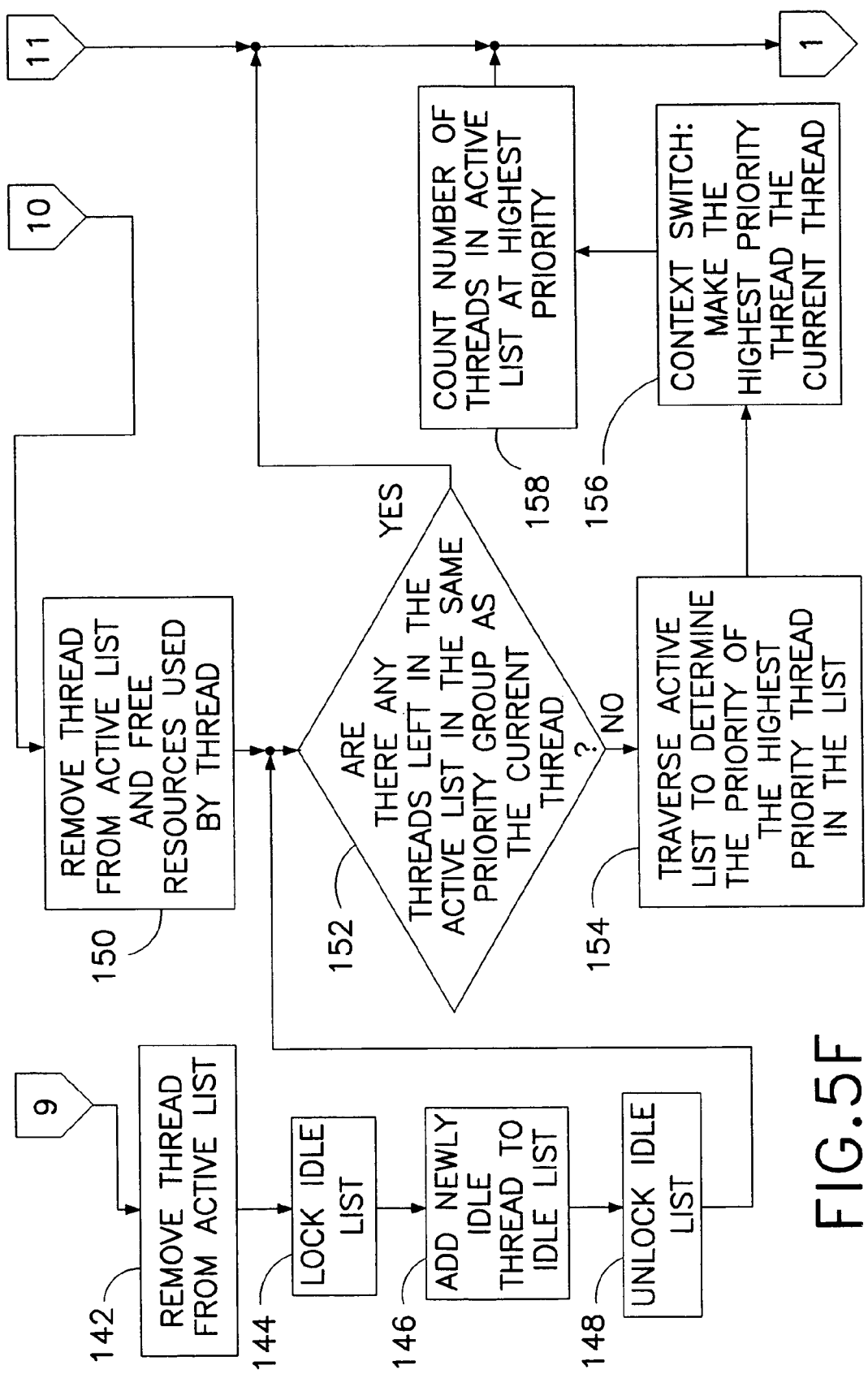

If the native thread 50, i.e., the respective instance of interpreter 24, discovers at check 136 that the currently executing thread has become idle as a result of the last executed instruction thereof, that thread is removed from the respective active thread list 56 in a step 142 (FIG. 5F). This removal requires adjustment in the pointer of the active thread immediately preceding the removed thread in the active thread list 56. The queue mutex 52 of the respective native thread 50 is then locked in a step 144, the newly idled thread is inserted in idle thread list 34 in a step 146, and the mutex 52 is unlocked in a step 148. The insertion of a thread into the idle thread list 34 entails the adjustment of pointers of the inserted thread and of the thread immediately preceding the inserted thread in the idle thread list 34.

If the native thread 50, i.e., the respective instance of interpreter 24, discovers at check 138 that the currently executing thread has terminated its task or job as a result of the last executed instruction, the thread is removed from active list 56 in a step 150 (FIG. 5F). Also, resources are freed which were being used by the terminated thread.

After the transfer of a thread from active list 56 to idle list 34 in steps 142, 144, 146, 148 (FIG. 5F) or after the removal of a terminated thread from active list 56 in step 150, the interpreter 24 of the relevant native thread 50 investigates at 152 whether there are any threads left in the active list 56 in the same priority group as the current thread. If so, the interpreter 24 returns to perform maintenance tasks in step 70 (FIG. 5A). If not, the interpreter 24 or native thread 50 runs through the active list 56 in a step 154 to determine the priority of the highest priority thread in the list. In subsequent steps 156 and 158, the highest priority thread is made the current thread and the number of threads in the active list 56 at the highest priority level is counted. The interpreter 24 returns to perform maintenance tasks in step 70.

After having determined at checks 136 and 138 (FIG. 5E) that the current thread has not become idle or terminated its task upon the execution of a last bytecode instruction, interpreter 24 queries at a decision junction 160 whether the current thread's priority group has changed as a result of the instruction that was just executed. If not, check 140 is undertaken to determine whether the time slice has expired. If so, interpreter 24 questions at 162 (FIG. 5D) whether the priority group of the current thread has increased or decreased. In the case of an increase, the thread number in the highest priority group is reset to unity in a step 164. In the case of a decrease, the count of threads in the highest priority group is decremented in a step 166. The interpreter 24 investigates at a decision junction 168 whether there are any active threads left in the highest priority group. A negative outcome to this investigation leads the interpreter 24 to scan the active threads in a step 170 to determine a new highest priority group and to count the number of threads in that group. The interpeter 24 then undertakes a context switch in a step 172, with the highest priority active thread 58 becoming the current thread.

A positive outcome to investigation or decision junction 168 (FIG. 5D) leads the interpreter 24 directly to context switch step 172 and from that step to read and execute steps 132 and 134.

Thread Load Balancing

As stated above, there may be multiple native threads 50, each executing instructions from a linked list 56 of active virtual threads 58. When a virtual thread becomes active and is assigned to a native thread 50, the system attempts to assign it to the native thread with the lightest load. This keeps the virtual threads evenly balanced between the native threads.

As active threads terminate or become idle, they will not necessarily do so in an even fashion—on a system with two native threads, each assigned ten virtual threads, it's quite possible for six virtual threads in one native thread to all terminate or become idle, leaving two native threads, one with four virtual threads, and one with ten.

It is desirable to avoid unbalanced or uneven loads among native threads 50 because such a circumstance does not make efficient use of the processors on a multi-processor machine. To solve this problem, virtual threading undertaken by interpreter 24 uses a technique called thread balancing. The basic principle of thread balancing is that the interpreter 24 should periodically check the set of running virtual threads 58 and redistribute them to maintain a balanced distribution of virtual threads among native threads 50. The thread balancing must be done carefully so as to avoid making native threads 50 stop to wait for locked data to become available.

Any native thread 50 may perform thread balancing. Each native thread 50 maintains a counter (not shown), which the native thread increments every time the thread has completed execution of a complete set of time slices (that is, the native thread 50 reached the end of its list 56 of active threads 58 and has started again from the beginning). When this counter reaches a certain value which is selected to accord with the platform, the expected applications set and the preferences of the operator, the counter is reset to zero, and the native thread 50 attempts to perform thread balancing.

When it is time for a native thread 50 to perform thread balancing, it should skip the balancing operation if another native thread is already in the process of performing balancing. The coordination of thread balancing among several native threads 50 is accomplished through use of a global mutex (not illustrated). A native thread 50 must have a lock on this mutex in order to perform thread balancing. When a native thread 50 accesses the global mutex and finds that it is locked, the native thread does not wait for the mutex to become unlocked but instead skips thread balancing.

Once a native thread 50 has a lock on the balancing mutex, the native thread must iterate over the native thread table 36 twice. Each native thread 50 maintains a thread load value (described above; typically a sum of the priorities of all active threads). During the first pass through the native thread table 36, the thread 50 that's performing the balancing sums the load values of all the native threads. This sum of all the native thread loads is then divided by the number of native threads 50 to derive an average load. During the second pass through the native thread list, if any native thread 50 has a load that's greater than the average load, that native thread's active list 56 is locked and virtual threads are removed from the active list, starting with low priority threads and moving towards high priority threads, until the native thread's load is equal to or less than the average load.

These virtual threads are then assigned to native threads as if they had just become active, using the usual algorithm (determine the native thread with the lightest load, and assign the virtual thread to it).

Named Threads

When an application executes an instruction that creates a new thread, the application typically receives a unique identifier for the thread that was just created. These identifiers are typically unique numerical codes that are assigned dynamically as threads are created, and they can be used to specify target addresses when sending an inter-thread message.

Sometimes, however, it is desirable for one application to exchange messages with another application that's already running. In this case, the dynamically-assigned numeric ID of the target thread is not available to the sending application.

It is therefore recommended that the interpreted language provide an instruction for assigning a name to a thread, or make such a function part of the instruction that creates a new thread. A thread name is a string of text that can be used to uniquely identify a thread. Typically, an application developer will use some identifier that's unique to them (such as the serial number of their development package) combined with a descriptive name for the application (such as "Whiteboard") to make a unique thread name that they can use for that application.

When an application needs to send a message to another thread, it may do so either by the thread's dynamically assigned unique numeric ID, or by the thread's name, if a name has been assigned.

Thread Messages and Networking

Inter-thread messages are a powerful means for communication between components of an application, especially user interface components such as buttons and scrollbars, and with thread names they form a powerful mechanism for communication between applications running on the same computer.

Additionally, thread messages can form a powerful means of communicating between applications on different computers. If this is implemented properly, it will be transparent to applications and application developers—whether a thread message is being sent to a named thread on the local computer, or a named thread on a remote computer should not affect the nature of the instructions needed to send the message.

Figure 6:
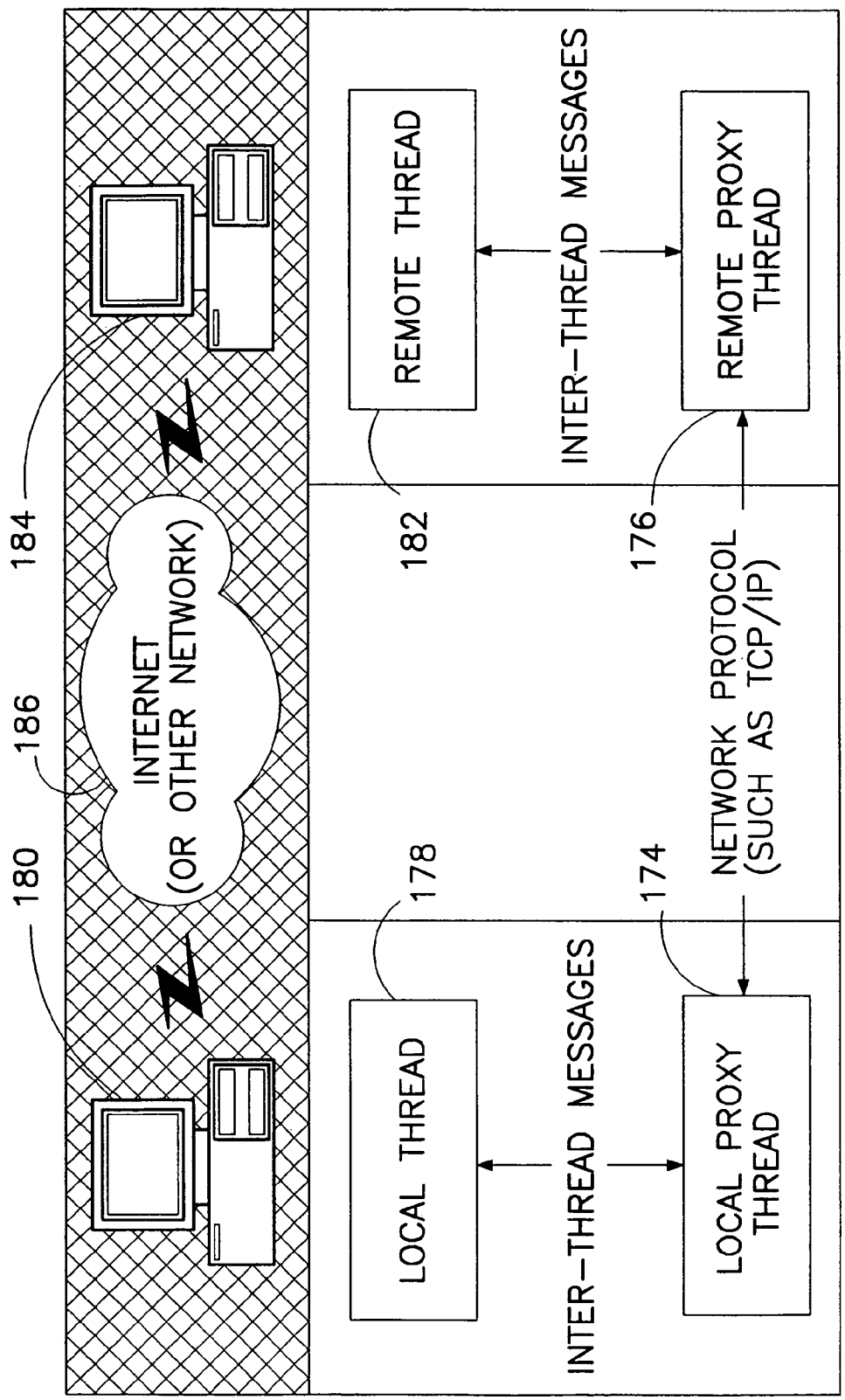
FIG. 6 is a block diagram showing communication between two computers using the virtual threading of the present invention.

This communication between applications on different computers is accomplished by the use of proxy threads 174 and 176 (see FIG. 6). When a thread 178 on a local computer 180 needs to communicate with a thread 182 on a remote computer 184, the thread 178 on the local computer 180 must execute an instruction to connect to the remote thread 182. When the instruction is executed, a new local proxy thread 174 is created. That proxy thread 174 executes a code module that connects to the remote computer 184. The remote computer 184 receives the connection and creates its own proxy thread 176. The proxy threads 174 and 176 then communicate with each other over a network 186 using standard network protocols such as TCP/IP.

The local thread 178 that executed the original connection instruction now receives the ID of the local proxy thread 174. Local thread 178 can use that ID as if it were the ID of the remote target thread 182—that is, local thread 178 can use the ID of the local proxy thread 174 as the address for inter-thread messages that are targeted at the remote thread 182.

Whenever the local proxy thread 174 receives a message, it creates a representation of that message in a binary buffer (not shown), and sends that buffer over the network 186 to the remote proxy thread 176 using the standard protocol. The remote proxy thread 176 then translates the binary buffer representation of the message back into a standard message and forwards the message to the remote thread 182.

The same system is used to transmit messages in the other direction—if the remote proxy thread 176 receives a message, that message is translated and sent over the network to the local proxy thread 174, which forwards it to the local thread 178.

It is to be understood that processor modules disclosed herein may be hard wired components or generic computer circuits modified by programming to perform the indicated functions. Thus, an interpreter may be realized by digital circuitry modified by software to compile user's source code into pseudocode, to create virtual threads for carrying out tasks or jobs, processing pseudocode instructions selected in accordance with a currently executing virtual thread, etc.

It is to be further understood that descriptions herein of the interpreter 24 and its operations apply to any instance of the interpreter that is running, i.e., to different native threads 50.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for operating a computer, comprising:

storing in a computer memory a plurality of pseudocode instructions, at least some of said pseudocode instructions comprising a plurality of machine code instructions;

for each of a plurality of tasks or jobs to be performed by the computer, automatically creating a respective virtual thread of execution context data including (a) a memory location of a next one of said pseudocode instructions to be executed in carrying out the respective task or job and (b) the values of any local variables required for carrying out the respective task or job, a plurality of said tasks or jobs each entailing execution of a respective one of said pseudocode instructions comprising a plurality of machine language instructions;

processing each of said tasks or jobs in a respective series of time slices or processing slots under the control of the respective virtual thread; and in every context switch between different virtual threads, undertaking such context switch only after completed execution of a currently executing one of said pseudocode instructions, wherein the creating of the virtual threads, the processing of said tasks or jobs in respective series of time slices or processing slots, and the undertaking of context switches all include the operating of the computer under an interpreter program.

2. The method defined in claim 1 wherein each of the virtual threads is part of a respective linked list of virtual threads, each of the virtual threads further including a pointer to a next virtual thread in the respective linked list, further comprising, for every context switch between different virtual threads, consulting the pointer of a currently executing virtual thread to determine an identity of a next virtual thread to be executed.

3. The method defined in claim 2 wherein said respective linked list is one of a plurality of linked lists of said virtual threads, one of said linked lists being a list of idle virtual threads, another of said linked lists being a list of active virtual threads, an additional one of said linked lists being a list of queued virtual threads, further comprising periodically moving at least one virtual thread from said list of queued virtual threads to said list of active virtual threads.

4. The method defined in claim 3 wherein the moving of a virtual thread from said list of queued virtual threads to said list of active virtual threads includes:

setting a mutex to lock said list of queued virtual threads;

subsequently modifying pointers in (i) the moved virtual thread, (ii) at least one virtual thread originally in said list of active virtual threads, and (iii) at least one virtual thread remaining in said list of queued virtual threads; and thereafter resetting or releasing the mutex to enable access to said list of queued virtual threads.

5. The method defined in claim 1 wherein each of said virtual threads is assigned a message queue, further comprising entering a message in a message queue of a selected one of said virtual threads during execution of a task or job pursuant to another one of said virtual threads.

6. The method defined in claim 5 wherein said selected one of said virtual threads and said another one of said virtual threads correspond to respective tasks or jobs derived from different applications programs, whereby the entering of said message in the message queue of said selected one of said virtual threads implements data transfer between said different applications programs.

7. The method defined in claim 5 wherein said selected one of said virtual threads and said another one of said virtual threads are proxy or interface threads on different computers, the entering of said message in said message queue including transmitting said message over a communications link between said computers.

8. The method defined in claim 1, further comprising running a plurality of instances of said interpreter program on the computer, each instance corresponding to a native thread, each native thread:

creating a respective set of virtual threads of execution context data;

processing each of a plurality of tasks or jobs in a respective series of time slices or processing slots under the control of the respective virtual thread; and in every context switch between different virtual threads, undertaking such context switch only after completed execution of a currently executing one of said pseudocode instructions.

9. The method defined in claim 8, further comprising shifting a virtual thread from a first native thread having a heavier-than-average load to a second native thread having a lighter-than-average load.

10. The method defined in claim 9 wherein the shifting of a virtual thread includes:

determining an average load over all the native threads by summing thread load values for the native threads and dividing by the number of threads; and for each of the native threads, comparing the respective thread load value with the average load to determine relative load.

11. The method defined in claim 1 wherein said virtual threads include a first proxy thread for communicating with a second proxy thread on another computer via a computer network link, the processing of a communication with said another computer including using standard network protocols under the control of said first proxy thread.

12. The method defined in claim 11 wherein each of said virtual threads, including said first proxy thread, is assigned a respective message queue, further comprising entering a message in a message queue of said first proxy thread to execute a data transfer to said another computer over said computer network link.

13. The method defined in claim 1 wherein a selected one of said virtual threads is in an idle state, further comprising:
generating a message in response to an input from a source outside the computer;
inserting said message in a message queue for said selected one of said virtual threads;
changing said selected one of said virtual threads from said idle state to an active state;
after the inserting of said message in said message queue and the changing of the state of said selected one of said virtual threads, accessing said message queue to obtain said message during a time slice or processing slot assigned to said selected one of said virtual threads.

14. The method defined in claim 1 wherein each of said virtual threads additionally includes a thread priority, further comprising automatically consulting the thread priorities in a plurality of said virtual threads to determine relative priorities and varying a sequence of threads in accordance with the determined relative priorities.

15. The method defined in claim 1 wherein said time slots or processing slots are measured by counting consecutively executed pseudocode instructions, further comprising, for each of a plurality of said time slices or processing slots, terminating the respective time slot or processing slot upon counting a predetermined number of consecutively executed pseudocode instructions.

16. A method for operating a computer, comprising:
storing in a computer memory a plurality of pseudocode instructions, at least some of said pseudocode instructions comprising a plurality of machine code instructions;
for each of a plurality of tasks or jobs to be performed by the computer, automatically creating a respective virtual thread of execution context data including (a) a memory location of a next one of said pseudocode instructions to be executed in carrying out the respective task or job and (b) the values of any local variables required for carrying out the respective task or job, a plurality of said tasks or jobs each entailing execution of a respective one of said pseudocode instructions comprising a plurality of machine language instructions;
processing each of said tasks or jobs in a respective series of time slices or processing slots under the control of the respective virtual thread; and
in every context switch between different virtual threads, undertaking such context switch only after completed execution of a currently executing one of said pseudocode instructions,
wherein each of said virtual threads additionally includes a mutex, further comprising:
setting the mutex of a selected one of said virtual threads;
subsequently modifying data in said selected one of said virtual threads; and
thereafter resetting or releasing the mutex to enable access to said selected one of said virtual threads.

17. The method defined in claim 16 wherein the setting of said mutex of said selected one of said virtual threads, the modifying of said data, and the resetting or releasing of said mutex of said selected one of said virtual threads are performed in response to a message from one other of said virtual threads.

18. The method defined in claim 16 wherein each of the virtual threads is part of a respective linked list of virtual threads, each of the virtual threads further including a pointer to a next virtual thread in the respective linked list, the modifying of said data including modifying a pointer of said selected one of said virtual threads.

19. A method for operating a computer, comprising:
storing in a computer memory a plurality of pseudocode instructions, at least some of said pseudocode instructions comprising a plurality of machine code instructions;
for each of a plurality of tasks or jobs to be performed by the computer, automatically creating a respective virtual thread of execution context data including (a) a memory location of a next one of said pseudocode instructions to be executed in carrying out the respective task or job and (b) the values of any local variables required for carrying out the respective task or job, a plurality of said tasks or jobs each entailing execution of a respective one of said pseudocode instructions comprising a plurality of machine language instructions;
processing each of said tasks or jobs in a respective series of time slices or processing slots under the control of the respective virtual thread; and
in every context switch between different virtual threads, undertaking such context switch only after completed execution of a currently executing one of said pseudocode instructions,
wherein the tasks or jobs processed in respective series of time slices or processing slots under the control of the respective virtual threads include:
controlling objects imaged on a computer display, each of said objects constituting a separate task or job assigned a respective one of said virtual threads; and
monitoring actuation of keys on a computer keyboard, each of said keys constituting a separate task or job assigned a respective one of said virtual threads.

20. A multi-tasking computer comprising:
a memory;
a display;
an input peripheral;
at least one processor operatively connected to said memory, said display, and said input peripheral, said processor having:
a compiler for converting operator-entered source code instructions into bytecode or pseudocode instructions, said compiler being operatively linked to said memory for enabling the storage of said bytecode or pseudocode instructions therein; and
an interpreter for executing said bytecode or pseudocode instructions,
said memory storing a first linked list of idle virtual threads, a second linked list of active virtual threads, and a third linked list of queued or waiting virtual threads, each given one of said threads including context or state data, a mutex and a pointer to a next thread in the respective list in which said given one of said threads is listed, said interpreter being operatively connected to said input peripheral for recognizing an event generated by said input peripheral, said interpreter being operatively connected to said memory (a) for shifting at least one of said idle virtual threads from said first linked list to said third linked list, (b) for shifting queued or waiting virtual threads from said third linked list to said second linked list, (c) for executing said bytecode or pseudocode instructions according to context and state data of different virtual threads in said second linked list in successive time slices or processing slots pursuant to a predetermined priority schedule, for executing said bytecode or pseudocode instructions according to context and state data of different virtual threads in said second linked list in successive time slices or processing slots pursuant to a predetermined priority schedule, said interpreter being operatively connected to said display in part for modifying an object on said display in response to instructions specified by a respective active virtual thread in said second linked list associated with or assigned to said object.

21. The computer defined in claim 20 wherein:
said memory additionally stores a fourth linked list of native threads;
said interpreter is one of a plurality of instances of a common interpreter, each of said instances of said common interpreter corresponding to a respective one of said native threads;
said second linked list is one of a plurality of linked active-thread lists, each of said native threads being linked by a respective pointer to a respective one of said linked active-thread lists; and
said third linked list is one of a plurality of linked queued-thread lists, each of said native threads being linked by a respective pointer to a respective one of said linked queued-thread lists.

22. The computer defined in claim 21 wherein said active threads +each includes a mutex for enabling locking of the respective thread by one native thread to prevent access to the respective thread by other native threads.

23. The method defined in claim 21 wherein said interpreter includes means shifting a virtual thread from a first native thread having a heavier-than-average load to a second native thread having a lighter-than-average load.

24. The computer defined in claim 20 wherein said list of idle virtual threads includes a plurality of threads assigned to respective keys of a keyboard for processing actuations of the respective keys.

25. The computer defined in claim 20 wherein said list of idle threads includes a plurality of threads assigned to respective objects in a display image for processing changes in appearance of the respective objects.

26. The computer defined in claim 20 wherein said interpreter includes a context switch module and a instruction counter, said context switch module being operatively connected to said memory and said instruction counter for effectuating a context switch from a currently executing active thread of said second linked list to a next active thread in said second linked list upon execution of a predetermined number of bytecode or pseudocode instructions pursuant to said currently executing active thread.

27. The computer defined in claim 20 wherein each of said virtual threads includes a memory location of a next instruction to execute in the respective thread, values of any local variables for the respective thread, and an execution priority for the respective thread.

28. The computer defined in claim 20 wherein said memory stores a plurality of message queues assigned to respective ones of said threads.

29. The computer defined in claim 20 wherein said memory stores at least one proxy or interface thread having an execution context for carrying out a communication with a remote computer via a communications link, said proxy or interface thread containing a memory address leading to a network protocol routine.

* * * * *